United States Patent
Bednarski et al.

(10) Patent No.: US 10,620,018 B2
(45) Date of Patent: Apr. 14, 2020

(54) METHOD FOR MEASURING THE DISPLACEMENT PROFILE OF BUILDINGS AND SENSOR THEREFOR

(71) Applicant: SHM System Spółka z ograniczoną odpowiedzialnością; Sp. komandytowa, Cracow (PL)

(72) Inventors: Lukasz Bednarski, Kielce (PL); Rafal Sienko, Kraków (PL)

(73) Assignee: SHM SYSTEM SPÓLKA Z ORGANICZONA ODPOWIEDZIALNOSCIA Sp. KOMANDYTOWA, Cracow (PL)

( * ) Notice: Subject to any disclaimer, the term of this patent is extended or adjusted under 35 U.S.C. 154(b) by 159 days.

(21) Appl. No.: 15/849,804

(22) Filed: Dec. 21, 2017

(65) Prior Publication Data
US 2018/0113009 A1 Apr. 26, 2018

Related U.S. Application Data

(63) Continuation-in-part of application No. PCT/PL2016/000063, filed on Jun. 17, 2016.

(30) Foreign Application Priority Data

Jun. 24, 2015 (PL) .......................... 412838

(51) Int. Cl.
*G01D 5/353* (2006.01)
*G01L 1/24* (2006.01)
(Continued)

(52) U.S. Cl.
CPC ......... *G01D 5/35316* (2013.01); *G01D 5/353* (2013.01); *G01D 11/30* (2013.01); *G01L 1/242* (2013.01); *G01M 5/0041* (2013.01)

(58) Field of Classification Search
CPC .... G01D 5/35316; G01D 5/353; G01D 11/30; G01L 1/242; G01M 5/0041
See application file for complete search history.

(56) References Cited

U.S. PATENT DOCUMENTS 4,929,553 A 5/1990 Bussey
5,844,667 A * 12/1998 Maron .................. G01L 9/0076
356/35.5
(Continued)

OTHER PUBLICATIONS

International Search Report for App. No. PCT/PL2016/000063 dated Oct. 27, 2016.

*Primary Examiner* — Georgia Y Epps
*Assistant Examiner* — Don J Williams
(74) *Attorney, Agent, or Firm* — Ralph E. Jocke; Colin P. Cochran; Walker & Jocke (57) ABSTRACT

Exemplary embodiments provide for a method for continuous measurement of displacements profile of building structures and a sensor for implementation of this method for repeated, automatic displacements profile measurements of the medium by means of optical fiber elements. This is of particular relevance in engineering structures, engineering structure elements, geotechnical structures. The apparatus is characterized in that the measurement involves a measuring sensor, which is constructed of a core with coupled optical fiber sensing elements for determining the core strains and an optical fiber sensing element for determining temperature, placed freely in an axial channel of the core, making possible to perform measurements in such a way, which that allows for compensation of the influence of sensor temperature.

20 Claims, 4 Drawing Sheets

(51) Int. Cl.
*G01D 11/30* (2006.01)
*G01M 5/00* (2006.01)

(56) References Cited

U.S. PATENT DOCUMENTS

| | | | | |
|---|---|---|---|---|
| 6,452,667 B1 * | 9/2002 | Fernald | ................... | G01K 5/52 250/227.14 |
| 2008/0204706 A1 | 8/2008 | Magne et al. | | |
| 2013/0336612 A1 | 12/2013 | Pearce | | |
| 2014/0312215 A1 | 10/2014 | Smith et al. | | |

\* cited by examiner fig.1 fig.2 fig.3

METHOD FOR MEASURING THE DISPLACEMENT PROFILE OF BUILDINGS AND SENSOR THEREFOR

This is a continuation-in-part application of International Application PCT/PL2016/000063, with an international filing date of Jun. 17, 2016, currently pending.

BACKGROUND

Electrical sensors have for decades been the standard mechanism for measuring physical and mechanical phenomena. Despite their ubiquity, these sensors have inherent limitations such as transmission loss and susceptibility to electromagnetic interference (noise) that make their usage challenging or impractical in many applications. Fiber-optic sensing is an excellent solution to these challenges, using light rather than electricity and standard optical fiber in place of copper wire.

The tremendous amount of innovation over the past two decades in the optoelectronics and fiber-optic communication industries has significantly reduced optical component prices and improved quality. By leveraging these economies of scale, fiber-optic sensors and instruments have moved from experimental research applications in the lab to broad usage and applicability in field applications such as structural health monitoring.

INCORPORATED DISCLOSURES

U.S. patent application No. US2007/0065077 A1 is herein incorporated by reference and discusses a method for determining position and shape, and an apparatus for implementation of this method. The solution is used to determine displacements profile (shape) of a monitored structure, relative position of objects, modal analysis of mechanical systems, as well as minimally invasive surgical techniques and biometric monitoring. The device is based on optical fiber measurement technology using fiber Bragg gratings arranged in a number of at least one hundred along the individual optical fiber cores. For two-dimensional analysis an optical fiber with two cores and for three-dimensional with at least three (in the case of three-core fiber uniform distribution of cores around the system axis at 120° is assumed). A device attached to a monitored member (or embedded within it) determines its deformations on the basis of local strain measurements resulting from bending of the monitored member comprising optical fiber cores, so that it is possible, by summing, to reconstruct the actual curvature of the monitored member. Analysis is performed in a discrete way basing on quasi-continuous measurements (fiber Bragg gratings arranged in specific intervals over the length of fiber optic core) but does not account for the effects caused by temperature. It is also not possible to analyze the sensor displacements profile caused by both bending and axial force loading.

U.S. patent application No. US 2010/0215311 A1 is herein incorporated by reference and discusses a method and apparatus for determining position and shape using a multi-core optical fiber applied primarily for determining relative position. The approach uses three cores arranged uniformly within an optical fiber cross section, passing parallel along its length. Inside the optical fiber line there are a variety of single strain sensors based on principles of Bragg gratings, Rayleigh scattering or other approaches. The method and apparatus allow a suitable package of functions for determination of curves, bending surface directions and twisting of optical fiber placed freely in a protective outer jacket. This jacket is in no way connected with the optical fiber, and therefore deformations of optical fiber in the form of twisting or unscrewing are not limited along its length. The procedure for determining displacement profiles of optical fiber in three-dimensional space (the shape) is performed under the assumption that one end has a fixed (known) position, while the other moves freely. From this assumption directly results the fact that displacements of optical fiber are not affected by axial force. Furthermore, the solution allows one to determine the shape only in a discrete way (quasi-continuous) over the length of the optical fiber and does not consider variation of results due to temperature influence.

U.S. patent application No. US 2014/0320846 A1 is herein incorporated by reference and discusses a device for determination of the position and/or shape of an object in three dimensional space, applied in the construction industry, space and medical industry. Average strains along the length of optical fiber are determined based on registered, total changes of optical length. The device uses multi-core optical fiber. In a cross section there are three cores intertwined together in the form of a helix and arranged in the outer part at 120°, while one core is located in the axis of the cross section. Measurement data from the central core is related to the averaged values from external cores. The central core is susceptible to the effects of temperature and changes in the axial force (tension changes), but in contrast to the outer core, does not experience the change in length resulting from the influence of torque around the axis of the profile. This fact allows for measurement compensation due to the influence of either a longitudinal force and temperature, or torque, or all of these above effects. Performing measurement is done using laws of Rayleigh scattering. Thus, the need for Bragg gratings is eliminated, and the device enables continuous analysis of displacements profile over the entire length of specified measuring segment with high resolution.

SUMMARY

An exemplary embodiment provides a method for continuous measurement of the profile of displacements of building structures and a sensor for implementation of this method for repeated, automatic displacement profile measurements of the medium by means of optical fiber elements, especially in engineering structures, engineering structure elements, geotechnical structures, or other mediums, and an apparatus for implementation of a method. The method and the sensor according to the embodiments allows for repeated, automatic and maintenance-free determination of time-varying displacement profiles of various types of mediums, in particular ground, structures (eg. bridges) or selected structural elements of buildings (eg. determination of beams deflection shape).

The exemplary method and the exemplary sensor allow for performing measurements for both small and large displacements. The exemplary method and the exemplary sensor allow for determination of displacements from both effects of bending and tensile or compressive longitudinal force as well as for automatic compensation of influences caused by temperature varying over the length of the measuring apparatus.

Exemplary embodiments described herein have numerous beneficial properties and uses.

BRIEF DESCRIPTION OF THE DRAWINGS

An exemplary sensor is illustrated in the drawings, in which.

DETAILED DESCRIPTION

Figure 1:
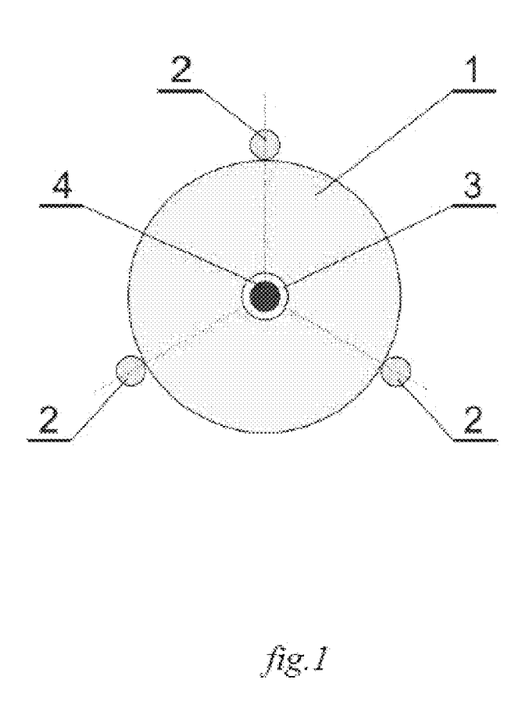
FIG. 1 shows a sensor having a circular cross section.
Figure 2:
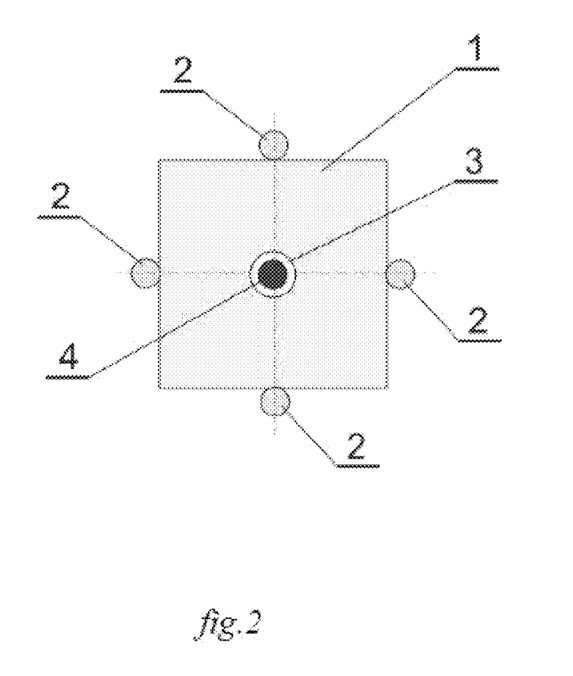
FIG. 2 shows a sensor with a square cross section.
Figure 3:
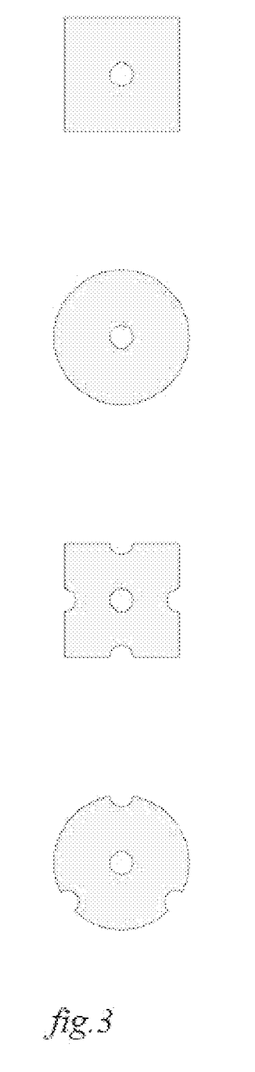
FIG. 3 shows a sensor core with four different cross sections.
Figure 4:
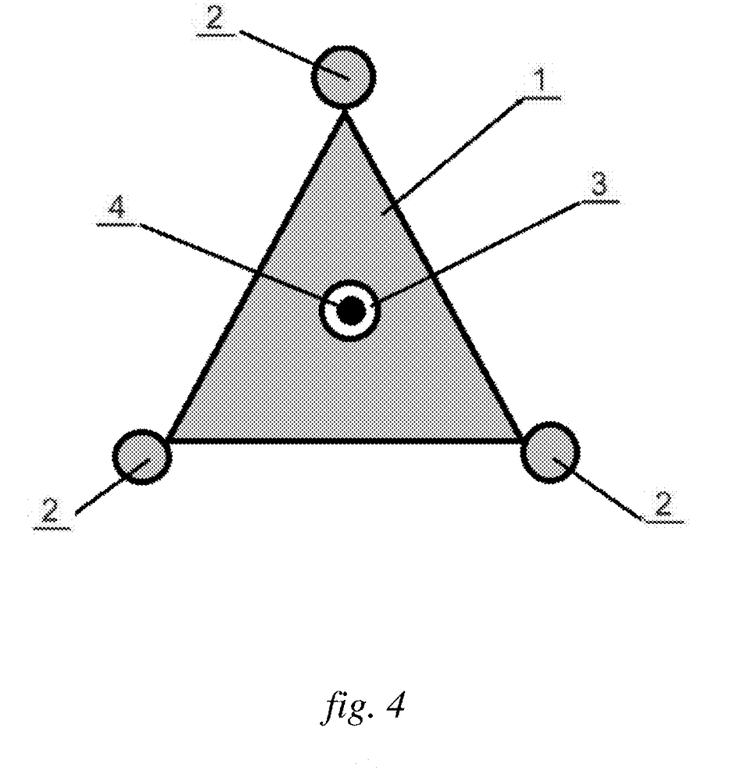
FIG. 4 shows a sensor with a triangular cross section.
Figure 5:
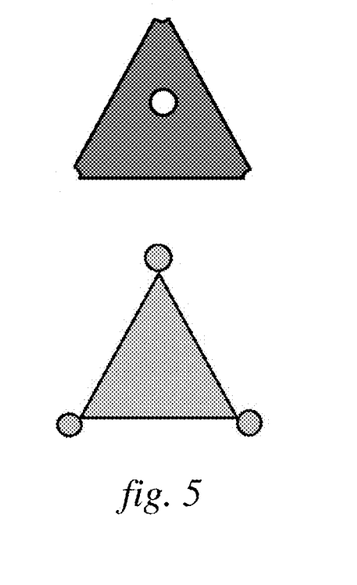
FIG. 5 shows a cross section of a sensor with and without the outer sensors.

All known solutions are based on the assumption that the sensing element, which is a multi-core fiber optic element, is a free element. This means that only one end of the sensing element can be immobilized, while the whole remaining sensing element is free. With this assumption, a sensing element with optical fibers located inside can freely change its length under the influence of temperature. The known solutions do not account for the influence of temperature changes in the case when the sensing element movement is limited, constrained by the medium in which it is placed, and which displacements have to be determined. The medium limiting the movement of a fiber optic sensing element can be e.g.: soil or concrete. Despite the change in temperature of the medium, a fiber optic sensing element cannot freely change its length. Since the measurement signal obtained from the optical fiber sensors is just as sensitive to both the temperature and strains, it precludes in this case of prior approaches correct interpretation of measurement data, and thereby precludes correct determination of the examined medium profile.

An exemplary embodiment provides a new method for determining a displacements profile of a medium with time-varying temperature, i.e. displacements of building structures, and a sensor for implementation of this method. Such medium is e.g.: the ground or concrete, which is subjected to daily, monthly and yearly temperature changes. An exemplary embodiment provides for determining the temperature effect using a free, unloaded by medium strains, fiber optic element for sensing temperature within the sensor.

A fiber-optic sensor works by modulating one or more properties of a propagating light wave, including intensity, phase, polarization, and frequency, in response to the environmental parameter being measured. Extrinsic (hybrid) optical sensors use the fiber only as a mechanism to transmit light to and from a sensing element, while intrinsic optical sensors use the optical fiber itself as the sensing element.

At the heart of optical sensing technology is the optical fiber—a thin strand of glass that transmits light within its core. An optical fiber is composed of three main components: the fiber core, the cladding, and the buffer coating. The cladding reflects stray light back into the fiber core, ensuring the transmission of light through the fiber core with minimal loss. This is achieved with a higher refractive index in the fiber core relative to the cladding, causing a total internal reflection of light. The outer buffer coating serves to protect the fiber from external conditions and physical damage. It can incorporate many layers depending on the amount of ruggedness and protection required.

One of the most commonly used and broadly deployed optical sensors is the fiber Bragg grating, which reflects a wavelength of light that shifts in response to variations in temperature and/or strain. Fiber Bragg gratings are constructed by using holographic interference or a phase mask to expose a short length of photosensitive fiber to a periodic distribution of light intensity. The refractive index of the fiber is permanently altered according to the intensity of light it is exposed to. The resulting periodic variation in the refractive index is called a fiber Bragg grating.

When a broad-spectrum light beam is sent to a fiber Bragg grating, reflections from each segment of alternating refractive index interfere constructively only for a specific wavelength of light, called the Bragg wavelength. This effectively causes the fiber Bragg grating to reflect a specific frequency of light while transmitting all others. Changes in strain and temperature affect both the effective refractive index and grating period of a fiber Bragg grating, which results in a shift in the reflected wavelength.

Because a fiber Bragg grating responds to both strain and temperature, it is useful to account for both effects and distinguish between the two. For sensing temperature, the fiber Bragg grating must remain unstrained. One can use packaged fiber Bragg grating temperature sensors to ensure the fiber Bragg grating inside the package is not coupled to any bending, tension, compression, or torsion forces. The expansion coefficient of glass is practically negligible. Therefore, changes in the reflected wavelength due to temperature can be primarily described by the change in the refractive index of a fiber.

Fiber Bragg grating strain sensors are somewhat more complex because both temperature and strain influence the sensor's reflected wavelength. Therefore, for proper strain measurements, it is useful to compensate for the temperature effects on the fiber Bragg grating. One may achieve this by installing a fiber Bragg grating temperature sensor in close thermal contact with the fiber Bragg grating strain sensor. A subtraction of the fiber Bragg grating temperature sensor wavelength shift from the fiber Bragg grating strain sensor wavelength shift using signal processing circuitry, yields a temperature compensated strain value.

The process of mounting a fiber Bragg grating strain gage is similar to mounting electrical gages, and fiber Bragg grating strain gages may have a variety of form factors and mounting options including epoxy, weldable, bolt-on, and embedded.

Optical fiber sensing elements are optical fibers designed to measure strain and temperature. Within discrete measurements this is optical fiber with applied Bragg grating. Within continuous measurements (approximately at every point of the fiber) there are telecommunications optical fibers, which can be analyzed using, in particular but not limited to, the phenomenon of Rayleigh, Raman or Brillouin scattering.

Exemplary embodiments provide for a method for continuous displacements profile measurement of mediums such as building structures characterized in that the measurement involves a measuring sensor, which is constructed of a core with fixedly coupled optical fiber sensing elements for determining the core strains, and an optical fiber sensing element for determining temperature, placed freely movable in an axial channel of the core, making it possible to perform measurements in a way that allows for compensation of the influence of ambient temperature. An exemplary embodiment is operative to perform continuous displacements profile measurement of building structures through measurement of strains of the measuring sensor, placed in the examined medium. The free optical fiber sensing element is responsible for determining the temperature, and due to its location in the exemplary arrangement within the neutral axis of the sensor core cross section, it is not susceptible to strains resulting from sensor axial strains, core bending or twisting. Measurement signals from each of the optical fiber sensing elements are read using appropriate signal processing circuitry and are analyzed through an electronic device circuit and are converted into a displacements profile of examined medium.

A further exemplary embodiment also includes a sensor for measuring displacements profile of mediums such as building structures characterized in that it consists of a sensor core and coupled with it optical fiber sensing elements for determining the core strains, wherein the sensor core in cross section at its neutral axis has formed therein a central channel in which optical fiber sensing element for determining temperature is freely movably placed. Preferably, the sensor core is a rod of a length appropriately chosen for the length of the examined medium, made of deformable material, for example, fiberglass, metal or plastic. Preferably, the central channel includes therein a friction reducing substance such as a lubricant to minimize friction between the optical fiber sensing element for determining temperature and the walls bounding the channel. In some embodiments, the cross section of the core is circular. In some embodiments, the cross section of the core is rectangular. In some embodiments, the cross section of the core is triangular. In some embodiments, the sensor core is symmetric about the axes passing through the points of fixed attachment of optical fibers. In some embodiments the sensor core of the measuring sensor has on its outside surface geometric elements for gluing or otherwise holding outer optical fiber sensing elements in fixed connection with the core. In some embodiments the core and the outer optical fiber sensing elements may be covered by a flexible sheath or other suitable flexible covering that does not restrict movement of the outer optical fibers or the core.

The measuring sensor consists of a monolithic (one piece) sensor core (1) and, appropriately arranged and coupled in fixed relation with the core (1), optical fiber sensing elements (2) for determining the core (1) displacements at each of the fibers which are alternatively referred to as strains. Core (1) within its neutral axis has a channel (3), in which an optical fiber sensing element for determining temperature (4) is positioned and is freely movable therein.

An exemplary sensor uses the fact that the measuring sensor adopts the shape and contours of medium displacements profile, in which the sensor has been placed. By determination of measuring sensor core shape from the strain sensing fibers the displacements in the profile shape of the core and the examined medium is determined. The freely movable temperature sensing element within the core enables determining fiber displacement solely due to temperature effects. Analysis of the strain signals from the fibers on the outside surface is conducted using appropriate signal processing circuitry which also uses the signals from the temperature sensing element to compensate for the effects of temperature on each of the strain sensing fibers.

As a result, exemplary embodiments provide an apparatus for measurement of displacement of a medium such as building or other structures. An embodiment includes a measuring sensor that is configured to be placed into engagement with the medium, the displacement of which is to be measured. The sensor contains a core which in cross section has an outside portion, to which outside portion a plurality of outer optical fiber sensing elements are attached. Each of the outer optical fiber sensing elements are coupled to the core outside portion in fixed relation by gluing or other suitable attaching methods. Each of the plurality of outer optical fiber sensing elements are usable in connection with signal processing circuitry to provide signals indicative of strain at the respective location of each outer optical fiber sensing element on the outside portion of the core.

The exemplary sensor further includes in cross section a central axial channel. An inner optical sensing element is positioned within the axial channel and is freely movable relative to the core within the axial channel. The inner coupled optical fiber sensing element is configured for use with signal processing circuitry to provide signals indicative of strains caused solely by core temperature, separate from the effects of deformation of the core itself. This is due to the freely movable nature of the inner coupled optical fiber sensing element.

The signals from the signal processing circuitry operatively connected to the plurality of outer optical fiber sensing elements and the inner coupled optical fiber sensing element are usable to determine displacement profile changes in shape of the core, which determined displacement measurements can be adjusted based on sensed temperature variations which are detected through operation of the inner coupled optical fiber sensing element to achieve accurate analysis of displacement of the core and the medium.

Exemplary embodiments may include a monolithic (one piece) core which is comprised of a rod having a length appropriately chosen to correspond to the length of the medium or structure whose displacement is to be evaluated. The exemplary core is comprised of a deformable material, which in exemplary embodiments may include material such as fiberglass, metals or plastics.

In exemplary arrangements the exemplary axial channel may include a friction reducing substance such as a suitable lubricant or other material which is operative to minimize frictional forces acting between the outer surface of the relatively movable inner optical fiber sensing element that is used to detect temperature, and the inner surface of the core which bounds the axial channel.

Exemplary sensor cores may have various cross sectional geometric shapes and arrangements for the outside portion. These may include the core being circular, rectangular or triangular. The outer optical fiber sensing elements may be arranged in different ways including symmetrical arrangements about the outside portion of the core. As previously mentioned, each of the outside fiber sensing elements may be attached in fixed engagement to geometric elements on the outside portion of the core. This may include for example at the corners of the geometric shapes which make up the outside portion of the core. The outside fiber sensing elements may be attached by gluing or other suitable fixed fastening methods to the geometric shapes or other attachment points of the outside portion of the core.

In use the exemplary sensor is placed into engagement with the medium or structure whose displacement is to be measured. The medium is included as part of a building structure or other structure to be analyzed. Signal processing circuitry in connection with each of the respective outer optical fiber sensing elements and the inner optical fiber sensing element is usable to provide signals that can be used by suitable signal processing and analysis devices to determine and provide outputs indicative of displacements of the core and the medium, which are adjustable for sensed temperature variations of the sensor. In exemplary embodiments the optical fiber sensing elements include Bragg gratings for purposes of providing the optical signals which can be processed for purposes of determining displacements.

Of course it should be understood that the foregoing descriptions are exemplary and in other embodiments other structures, arrangements, devices, methods and arrangements employing the principles described herein may be utilized.

The invention claimed is:

1. An apparatus for measurement of displacement of building or other structures comprising:
a measuring sensor,
wherein the measuring sensor is configured to be placed into engagement with a medium, the displacement of which is to be determined,
wherein the measuring sensor contains a monolithic core,
wherein in the cross section the core has an outside portion,
wherein a plurality of outer optical fiber sensing elements are arranged on the outside portion and are coupled with the core outside portion in fixed relation,
wherein each of the plurality the outer optical fiber sensing elements are configured for use with signal processing circuitry to provide signals indicative of strain at a respective location of each outer optical fiber sensing element on the outside portion the core,
wherein in cross section the core has a central axial channel,
wherein an inner optical fiber sensing element is positioned within the axial channel and is freely movable relative to the core within the axial channel,
wherein the inner optical fiber sensing element is configured for use with signal processing circuitry to provide signals indicative of strains caused by core temperature,
wherein signals from the signal processing circuitry are usable to determine displacements of the core which are adjusted for sensed temperature variations.

2. The apparatus of claim 1,
wherein the core includes a rod of a length appropriately chosen to correspond to a length of the medium,
wherein the core is comprised of a deformable material.

3. The apparatus according to claim 2
wherein the core is comprised of fiberglass, metal or plastic.

4. The apparatus of claim 1,
wherein the axial channel includes a friction reducing substance to minimize friction between the relatively movable inner optical fiber sensing element for determining temperature and the surface bounding the axial channel.

5. The apparatus of claim 1,
wherein in cross section the outside portion of the core is circular.

6. The apparatus of claim 1,
wherein in cross section the outside portion of the core is rectangular.

7. The apparatus of claim 1,
wherein in cross section the outside portion of the core is triangular.

8. The apparatus of claim 1,
wherein in cross section the plurality of outer optical fiber sensing elements are symmetrically arranged around the outside portion of the core.

9. The apparatus of claim 1,
wherein an outside surface of the outside portion of the core has geometric elements to which the outer optical fiber sensing elements are in fixed attached engagement.

10. The apparatus of claim 1,
wherein each of the plurality of outer optical fiber sensing elements and the inner optical fiber sensing element include fiber Bragg gratings.

11. A method comprising:
(a) placing a measuring sensor into engagement with a medium,
wherein the measuring sensor contains a monolithic core,
wherein the core in cross section has
a central axial channel,
wherein the central axial channel extends within the monolithic core,
an inner surface,
wherein the inner surface bounds the central axial channel, and
an outside portion,
wherein the outside portion is disposed on the core radially outward of the inner surface and includes an outer surface, wherein the outer surface bounds the outside portion,
wherein a plurality of outer optical fiber sensing elements are arranged on the outer surface and are coupled with the core outer surface in fixed relation,
wherein each of the plurality of outer optical fiber sensing elements are configured for use with signal processing circuitry to provide signals indicative of strain at a respective location of each outer optical fiber sensing element on the outer surface of the core,
wherein an inner optical fiber sensing element is positioned within the axial channel and is freely movable relative to the core within the axial channel,
wherein the inner optical fiber sensing element is configured for use with signal processing circuitry to provide signals indicative of strains caused by core temperature,
(b) using signals from the signal processing circuitry operatively connected to each of the outer optical fiber sensing elements and the inner optical fiber sensing element to determine displacements of the core and the medium which are adjusted for sensed temperature variations.

12. An apparatus for measurement of displacement of a building or other structure comprising:
a measuring sensor,
wherein the measuring sensor is configured to be placed into engagement with a medium, the displacement of which is to be determined,
wherein the measuring sensor contains a monolithic core,
wherein in cross section the core has
a central axial channel,
wherein the central axial channel extends within the monolithic core,
an inner surface,
wherein the inner surface bounds the central axial channel, and
an outside portion,
wherein the outside portion is disposed on the core radially outward of the inner surface and includes an outer surface, wherein the outer surface bounds the outside portion,
wherein a plurality of outer optical fiber sensing elements are arranged in disposed relation from one another on the outer surface and are coupled with the core outer surface in fixed relation, wherein each of the plurality of outer optical fiber sensing elements are configured for use with signal processing circuitry to provide signals indicative of strain at a respective location of each outer optical fiber sensing element on the outer surface of the core, wherein an inner optical fiber sensing element is positioned within the axial channel and is freely movable relative to the core within the axial channel, wherein the inner optical fiber sensing element is configured for use with signal processing circuitry to provide signals indicative of strain caused by core temperature, wherein signals from the signal processing circuitry are usable to determine displacements of the core which are adjusted for sensed temperature variations.

13. The apparatus according to claim 12
wherein the core includes a rod of a length appropriately chosen to correspond to a length of the medium, and wherein the core is comprised of a deformable material.

14. The apparatus according to claim 13
wherein the core is comprised of fiberglass, metal, or plastic.

15. The apparatus according to claim 12
wherein the axial channel includes a friction reducing substance to minimize friction between the relatively movable inner optical fiber sensing element for determining strain caused by temperature and the inner surface bounding the axial channel.

16. The apparatus according to claim 12
wherein in cross section the outer surface of the core is circular.

17. The apparatus according to claim 12
wherein in cross section the outer surface of the core is rectangular.

18. The apparatus according to claim 12
wherein in cross section the outer surface of the core is triangular.

19. The apparatus according to claim 12
wherein the outer surface of the core has geometric elements to which the outer optical fiber sensing elements are in fixed attached engagement.

20. The apparatus according to claim 12
wherein each of the plurality of outer optical fiber sensing elements and the inner optical fiber sensing element include fiber Bragg gratings.

* * * * *